(12) United States Patent
Addison et al.

(10) Patent No.: US 10,222,470 B2
(45) Date of Patent: Mar. 5, 2019

(54) METHOD AND DEVICE FOR PROCESSING RADAR SIGNALS

(71) Applicant: Infineon Technologies AG, Neubiberg (DE)

(72) Inventors: David Addison, Bristol (GB); Dian Tresna Nugraha, Munich (DE); Andre Roger, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 626 days.

(21) Appl. No.: 14/931,361

(22) Filed: Nov. 3, 2015

(65) Prior Publication Data

US 2016/0131744 A1 May 12, 2016

(30) Foreign Application Priority Data

Nov. 11, 2014 (DE) .......................... 10 2014 116 452

(51) Int. Cl.
  *G01S 7/35* (2006.01)
  *G01S 13/93* (2006.01)

(52) U.S. Cl.
  CPC ............ *G01S 13/931* (2013.01); *G01S 7/354* (2013.01); *G01S 2007/356* (2013.01); *G01S 2013/9321* (2013.01); *G01S 2013/9332* (2013.01)

(58) Field of Classification Search
  CPC ... G01S 13/931; G01S 7/354; G01S 2007/356
  See application file for complete search history.

(56) References Cited

U.S. PATENT DOCUMENTS

| | | | | |
|---|---|---|---|---|
| 4,680,589 A | * | 7/1987 | Bryant | G01S 7/2921 342/159 |
| 5,570,093 A | * | 10/1996 | Aker | G01S 7/003 342/104 |
| 5,613,039 A | * | 3/1997 | Wang | G01J 3/453 706/24 |
| 5,638,281 A | * | 6/1997 | Wang | G01J 3/453 701/301 |

(Continued)

FOREIGN PATENT DOCUMENTS

DE 102013221766 A1 5/2014
JP S60-93977 A 5/1985

(Continued)

OTHER PUBLICATIONS

German Patent Office, Office Action issued for DE 10 2014 116 452.0, dated Jul. 2, 2015, 6 pages.

(Continued)

*Primary Examiner* — Peter M Bythrow
(74) *Attorney, Agent, or Firm* — Schiff Hardin LLP

(57) ABSTRACT

A method for processing radar signals, wherein said radar signals comprise digitized data received by at least one radar antenna, the method comprising (i) determining FFT results based on the digitized data received; and (ii) storing a first group of the FFT results, wherein the first group of FFT results comprises at least two portions, wherein a first portion of FFT results is stored with a first accuracy and a second portion of FFT results is stored with a second accuracy.

26 Claims, 6 Drawing Sheets

(56) References Cited

U.S. PATENT DOCUMENTS

| | | | | |
|---|---|---|---|---|
| 6,011,507 | A * | 1/2000 | Curran | G01S 7/354 342/70 |
| 7,336,218 | B2 * | 2/2008 | Nishimura | G01S 13/345 342/101 |
| 7,420,502 | B2 * | 9/2008 | Hartzstein | G01S 7/032 342/175 |
| 7,639,171 | B2 * | 12/2009 | Alland | G01S 7/034 342/171 |
| 9,429,644 | B1 * | 8/2016 | Ormesher | G01S 7/414 |
| 2003/0156054 | A1 | 8/2003 | Ishii et al. | |
| 2010/0296565 | A1 | 11/2010 | Kun et al. | |
| 2011/0163906 | A1 * | 7/2011 | Yang | G01S 7/03 342/27 |
| 2011/0163909 | A1 * | 7/2011 | Jeong | G01S 13/4463 342/70 |
| 2011/0181459 | A1 * | 7/2011 | Feger | G01S 3/465 342/146 |
| 2014/0375491 | A1 * | 12/2014 | Roger | G01S 7/354 342/93 |
| 2016/0033631 | A1 * | 2/2016 | Searcy | G01S 7/2806 342/132 |

FOREIGN PATENT DOCUMENTS

| | | |
|---|---|---|
| JP | 2003-240845 A | 8/2003 |
| JP | 2009-092555 A | 4/2009 |
| JP | 2011-209016 A | 10/2011 |
| JP | 2014-106120 A | 6/2014 |

OTHER PUBLICATIONS

Hwang, Y.T., et al., "Design and FPGA Implementation of a FMCW Radar Baseband Processor," IEEE Asia Pacific Conference on Circuits and Systems (APCCAS), 2012, pp. 392-395.

Office Action dated Oct. 11, 2016 for Chinese Patent Application No. 2015-219622.

Office Action dated Jan. 19, 2017 for Korean Patent Application No. 10-2015-0157034.

* cited by examiner

METHOD AND DEVICE FOR PROCESSING RADAR SIGNALS

BACKGROUND OF THE INVENTION

Embodiments of the present invention relate to radar applications, in particular an efficient way to process radar signals obtained by at least one radar sensor, e.g., via at least one antenna. Processing radar signals in this regard in particular refers to radar signals received by a sensor or an antenna.

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant_false_alarm_rate.

CFAR algorithms are often complex and require a significant amount of time and/or resources, e.g., costly computation power. In case they need several clock cycles to provide a result, post-processing becomes delayed which results in a limited real-time (or nearly real-time) capability of the whole system.

SUMMARY

A first embodiment relates to a method for processing radar signals, wherein said radar signals comprise digitized data received by at least one radar antenna, the method comprising:
  determining FFT results based on the digitized data received;
  storing a first group of the FFT results, wherein the first group of FFT results comprises at least two portions, wherein a first portion of FFT results is stored with a first accuracy and a second portion of FFT results is stored with a second accuracy.

A second embodiment relates to a device for processing radar signals
  comprising a FFT engine for determining FFT results based on digitized data received from at least one antenna;
  comprising a compression engine for storing a first group of the FFT results, wherein the first group of FFT results comprises at least two portions, wherein a first portion of FFT results is stored with a first accuracy and a second portion of FFT results is stored with a second accuracy.

A third embodiment relates to a device for processing radar signals, wherein said radar signals comprise digitized data received by at least one radar antenna, comprising:
  means for determining FFT results based on the digitized data received;
  means for storing a first group of the FFT results, wherein the first group of FFT results comprises at least two portions, wherein a first portion of FFT results is stored with a first accuracy and a second portion of FFT results is stored with a second accuracy.

A fourth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

In a radar processing environment, a radar source emits a signal and a sensor detects a returned signal. The returned signal may be acquired in a time domain by at least one antenna, in particular by several antennas. The returned signal may then be converted into the frequency domain by conducting a Fast Fourier Transform (FFT), which may result in a signal spectrum, i.e. a signal distributed across the frequency. Frequency peaks may be used to determine potential targets, e.g., along a moving direction of a vehicle.

A Discrete Fourier Transform (DFT) may be implemented in computers by numerical algorithms or dedicated hardware. Such implementation may employ FFT algorithms. Hence, the terms "FFT" and "DFT" may be used interchangeably.

Figure 1:
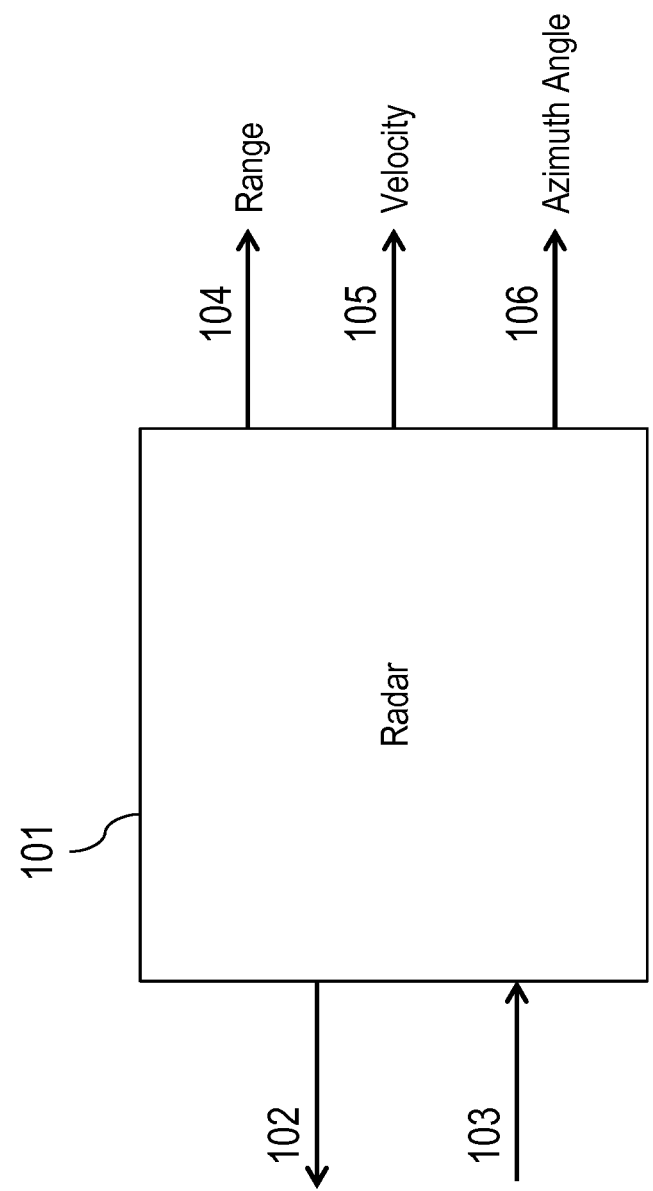
FIG. 1 shows a schematic diagram comprising an exemplary radar system emitting radar signals and receiving returned radar signals.

FIG. 1 shows a schematic diagram comprising an exemplary radar system 101 emitting radar signals 102 and receiving returned radar signals 103. The radar system 101 determines a range 104, a velocity 105 and an azimuth angle 106 based on the returned radar signals 103.

By using several receiving antennas, a phase difference of the received returned radar signals 103 may be used to determine the azimuth angle 106 via a third stage FFT. A first stage FFT based on the received returned (e.g., reflected emitted) radar signals 103 is used to determine the range 104, a second stage FFT based on the range 104 is used to determine the velocity 105 and the third stage FFT based on the velocity 105 is used to determine said azimuth angle 106.

In an exemplary scenario, the emitted radar signals 102 may be originated by two transmitter antennas towards an exemplary object. The signals 102 are reflected at the object and arrive at several (e.g., four) receiving antennas dependent on the azimuth angle with different phase position. Hence, the distances between the single object, the transmitter antennas and the receiver antennas may be deemed different.

In case the single object is considerably far away from the antennas, the beam paths may be treated as being parallel to each other.

Figure 2:
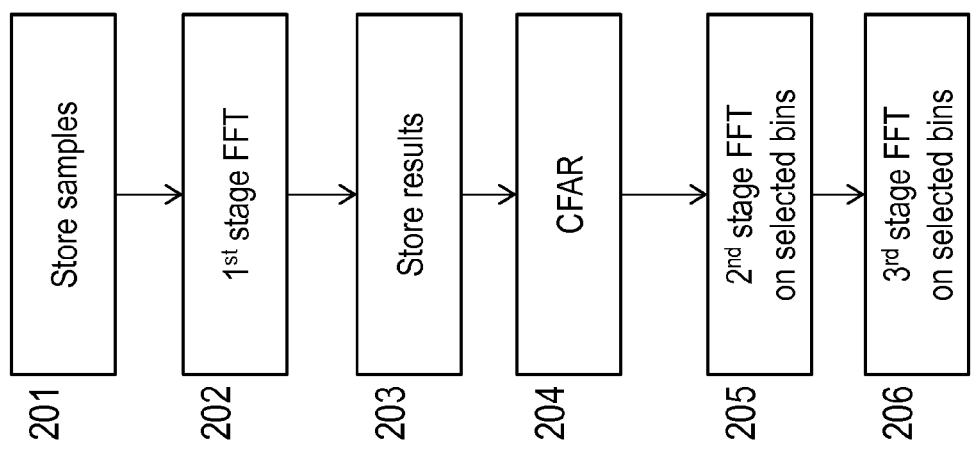
FIG. 2 shows an exemplary flow diagram comprising steps of how data can be processed in a radar application.

FIG. 2 shows an exemplary flow diagram comprising steps of how data can be processed in a radar application. In a step 201, samples received by a sensor are stored. In a step 202, a first-stage FFT is conducted and in a step 203 the results are stored. In a step 204 an optional CFAR algorithm may be run on the data stored in the step 203. In a subsequent step 205, a second stage FFT may be conducted on selected bins and in a step 206 a third stage FFT may be conducted on selected bins.

A bin in this regard in particular refers to at least one sample, a frequency or a frequency rage (e.g., a ramp of frequencies) that could be associated with a potential target (i.e. at least one potential target). The bin may comprise at least one FFT result (which may be identified by the CFAR algorithm), it may in particular refer to or be based on at least one FFT result.

As an option, after the step 206, a non-coherent integration may be conducted. For example, instead of calculating the next FFT result for the same antenna, the subsequent FFT result for the next antenna may be determined, multiplied with a compensation value (if applicable) and added to the previous sum. Hence, the third stage FFT result may be calculated across the antennas and stored in the buffer. After the last FFT result for the last antenna is calculated (and multiplied with its compensation value, if applicable) and added to the buffer, the buffer comprises a non-coherent integration over N antennas. This may then be saved to the memory.

FIG. 1 and FIG. 2 thus show that FFT results (intermediate spectrum) are to be saved to a memory for further processing purposes. Examples presented herein in particular allow a reduction of the required memory, which may lead to a reduced memory area on a chip and thus to a better cost-efficiency of the radar device. Another advantage is a reduction or memory transfer operations, which leads to a reduced computation time and to a reduced power consumption of the device.

Frequency-modulated continuous-wave radar (FMCW), also referred to as continuous-wave frequency-modulated (CWFM) radar, is a short-range measuring radar set capable of determining distances. This increases reliability by providing distance measurement along with speed measurement, which is beneficial in case there is more than one source of reflection arriving at the radar antenna. The transmitted signal may also be used as a local-oscillator signal for down conversion purposes, wherein an intermediate frequency is proportional to the distance of an object. Hence, the intermediate frequency spectrum determined by the first stage FFT may reveal a range (distance) of potential targets.

Several objects that may appear in the same range after the first stage FFT may be separated by conducting a second stage FFT for each bin of the first stage FFT results (and each receiving antenna) thereby determining the velocity of the respective object.

A third stage FFT based on the velocity bins is used to determine the azimuth angle of the respective object.

Hence, the first stage FFT separates the covered range into bins (also referred to as bin results). Each FFT bin (result) may correspond to a received signal per antenna based on an emitted radar ramp (an emitted signal with increasing frequencies), which was processed by the first stage FFT. The second stage FFT may be determined in a direction along the ramps based on at least one first stage FFT bin. The third stage FFT may be determined across the antenna based on at least one second stage FFT bin. Hence, each FFT stage may produce several bins that may be subject for further processing.

Storing bins requires memory. The more bins to be stored, the more memory is required.

Examples provided herein in particular suggest saving memory by not storing all bins. It may in particular be advantageous to select bins to be stored and/or bins not to be stored. Not storing a bin may in particular comprise not storing the data of such bin and/or replacing its value by zero or by a predefined value or threshold.

In case the radar device is part of a vehicle, the speed of the vehicle may indicate which information is required for determining whether or not an object is in front of the vehicle. If the vehicle is travelling within a city, a distance considerably nearer and a wider angle in front of the vehicle may be of interest compared to the vehicle driving at high speed on a highway.

For example, a radar device may determine 1024 samples (bins) for a frequency ramp (i.e. a frequency range from a first to a second value). These 1024 samples may cover a distance amounting to 200 m in front of the vehicle. Each bin may thus correspond to a section amounting to ca. 20 cm. In this example, measurements in the ranges between 0 m and 1 m and
between 160 m and 200 m may be ignored, which would reduce the number of bins (samples) to be stored by ca. 20%. In terms of memory size, this would allow using a 1 MB memory instead of a 1.2 MB memory.

Figure 3:
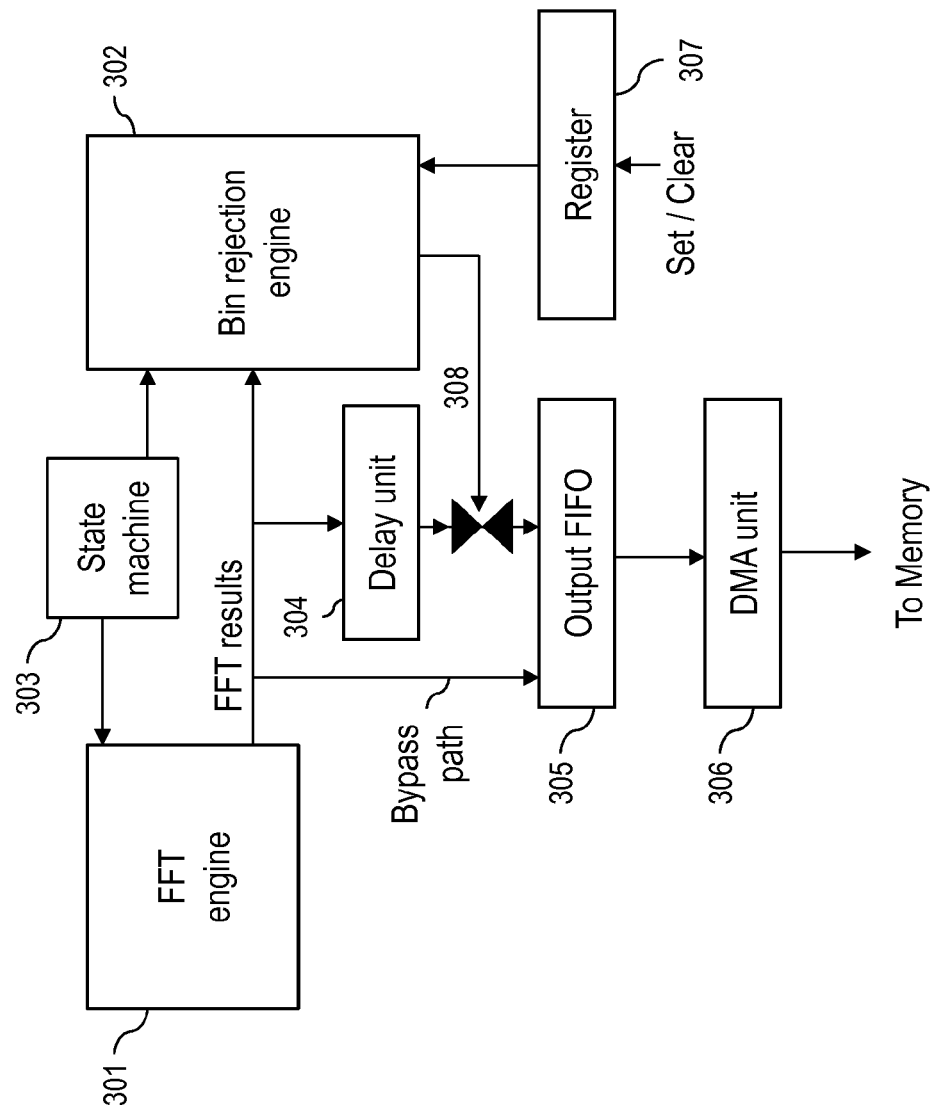
FIG. 3 shows an exemplary schematic architecture utilizing a combination of an FFT engine and a Bin rejection engine.

FIG. 3 shows an exemplary schematic architecture utilizing a combination of an FFT engine 301 and a Bin rejection engine 302. A state machine 303 is connected to the FFT engine 301 and to the Bin rejection engine 302. FFT results from the FFT engine 301 can be conveyed to an output FIFO 305 (FIFO: first-in-first-out, wherein the output FIFO 305 may comprise at least one FIFO register) to a delay unit 304 and to the Bin rejection engine 302. Results 308 computed by the Bin rejection engine 302 are used to enable writing the FFT results stored in the delay unit 304 to the output FIFO 305. The Bin rejection engine 302 may be supplied by a value from a register 307, which allows addressing bins of interest pursuant to the value of the register 307. The output of the FIFO 305 is conveyed to a DMA unit 306 (DMA: direct memory access), which is used to write results to a memory device.

The Bin rejection engine 302 may comprise an internal address counter, which may be updated each time a new bin of interest is checked.

If the Bin rejection engine 302 is not enabled, the state machine 303 is set such that FFT results from the FFT engine 301 are conveyed via a bypass path (preferably at full speed) from the FFT engine 301 to the output FIFO 305.

If the Bin rejection engine 302 is enabled, the state machine 303 is set such that FFT results are conveyed from the FFT engine 301 to the Bin rejection engine 302 for computation, e.g., FFT results may be passed to the Bin rejection engine 302. For each bin, the Bin rejection engine 302 may read the bins of interest from the register 307 to define which bins to be filtered (masked, rejected).

Hence, the Bin rejection engine 302 may suppress or mask certain bins from being further processed. These bins can be addressed or selected via the register 307. This register 307 may be a memory that allows selecting bins or groups of bins.

The Bin rejection engine 302 may be arranged in proximity to the FFT engine 301. Both may be arranged on a single device, in particular on a single chip. The Bin rejection engine 302 may in particular be part of the FFT engine 301 or vice versa.

Bins may be removed after the first FFT stage is conducted. This may result in a range limitation (see example above) and thus in focusing on a range that may be advantageously used for further processing steps, e.g., a second and/or third FFT stage. By focusing the range (area) to be processed, the amount of memory required can be significantly reduced.

The bin rejection may be able to filter out or mask at least one bin. The bin rejection may in particular be able to set at least one bin to a predefined value, e.g., 0, a maximum value, a minimum value. The filter (also referred to as mask) may determine a subset of FFT bins that are to be retained for further processing.

It is noted that the Bin rejection 302 engine may be supplied by such filter or mask from the register 307 or from a CPU, a CFAR engine or a threshold module.

The filter could be supplied by software and/or by hardware. The filter may be based on a CFAR algorithm (e.g., based on objects already detected by CFAR and cutting off ranges where no object was detected). The filter may be subject to a dynamic adaptation based on, e.g., a speed of a vehicle, surroundings (e.g., city, highway) of the vehicle and/or at least one object detected. The filter may also be determined based on a comparison of at least one bin with at least one adjacent bin. This may be achieved by an arithmetic operation.

The filter may comprise (at least) one mask bit for each bin in the FFT results. Such mask bit may enable various operation modes:

(1) Operation Mode: Bin Rejection:
If the mask bit is set, the associated bin is retained; if the mask bit is not set, the associated bin is not stored (i.e. "rejected", removed from the results).
(2) Operation Mode: Zeroing without threshold:
If the mask bit is not set, its value is set to zero. In such case, the associated bin is retained.
(3) Operation Mode: Zeroing with threshold:
If the mask bit is set, the associated bin is retained; if the mask bit is not set, the value of the associated bin is compared with a threshold value: If the value of the bin (reaches or) is above the threshold value, the associated bin is retained, otherwise the associated bin is rejected. It is noted that setting its value to zero may be an option for rejecting a bin.

Example: Bin Compression

According to another example, memory may be saved by adapting the FFT engine such that the output of the FFT engine is compressed. In such case, the output of the FFT leads to a reduced memory footprint.

The compression may be based on a progressive coding, which results in a combination (compression) of at least one portion of the bins. The compression may be conducted based on a characteristic of the human eye, which has a high accuracy for a short range and a lower accuracy for a long range. In other words, bins corresponding to a short range may be coded with a higher accuracy compared to bins that correspond to a long range.

For example, the bins of one frequency ramp cover to a distance of, e.g. 200 m ahead of the vehicle, each bin corresponds to a fraction thereof, e.g., to 20 cm. A first group of bins comprise the bins that correspond to the distance up to 70 m, a second group of bins comprise the bins that correspond to the distance from 70 m to 130 m and a third group of bins comprise the bins that correspond to the distance from 130 m to 200 m. The first group may not be compressed, because of the high accuracy that is favorable for the short range in front of the vehicle. The second group may be compressed with a first compression rate and the third group may be compressed utilizing a second compression rate. The second compression rate may be higher than the first compression rate. Each compression results in a reduced amount of memory required for storing bins compared to the scenario when no compression is applied and full accuracy is used.

Compression may be achieved by various means. One example is to combine FFT bins by adding them. For example, at least two FFT bins may be combined.

This example allows reducing the memory required for storing FFT bins. Also, a single frequency ramp can be used to acquire FFT bins.

A single acquisition cycle may comprise at least on frequency sweep, i.e. a frequency ramp; each ramp is sampled with a predefined sample rate, for instance 1024 samples which defines the size of the first stage FFT. This will result in several raw vector data sets: There will be as many vector data sets as there are frequency sweeps, typically a power of two as the number of ramps defines the size of the second stage FFT. In case of a 256 ramps acquisition cycle, 256 vectors each with 1024 samples will be obtained. After the first stage FFT there will again be 256 FFTs of 1024 bins each. Then due to the transpose operation, calculating FFTs along the ramp axle, may result in 1024 FFTs of 256 points.

After the first stage FFT is conducted, range gates are linearly distributed along the frequency axis of the spectrum; after the second stage FFT, velocity gates are linearly distributed along the frequency axis of the spectrum. The examples described here in particular utilize a non-linear processing of the FFT bins for scenarios (e.g., automotive radar processing applications) where distance and velocity precision may be of higher important on close objects than on far objects.

By compressing FFT bins, memory may be saved as only the information in the FFT spectrum that is required for further processing is stored. FFT bins may be accumulated (e.g., progressively coded by being combined and/or at least partially omitted) based on a predefined condition. This may result in a non-equidistant (i.e. progressive) spectrum.

Figure 4:
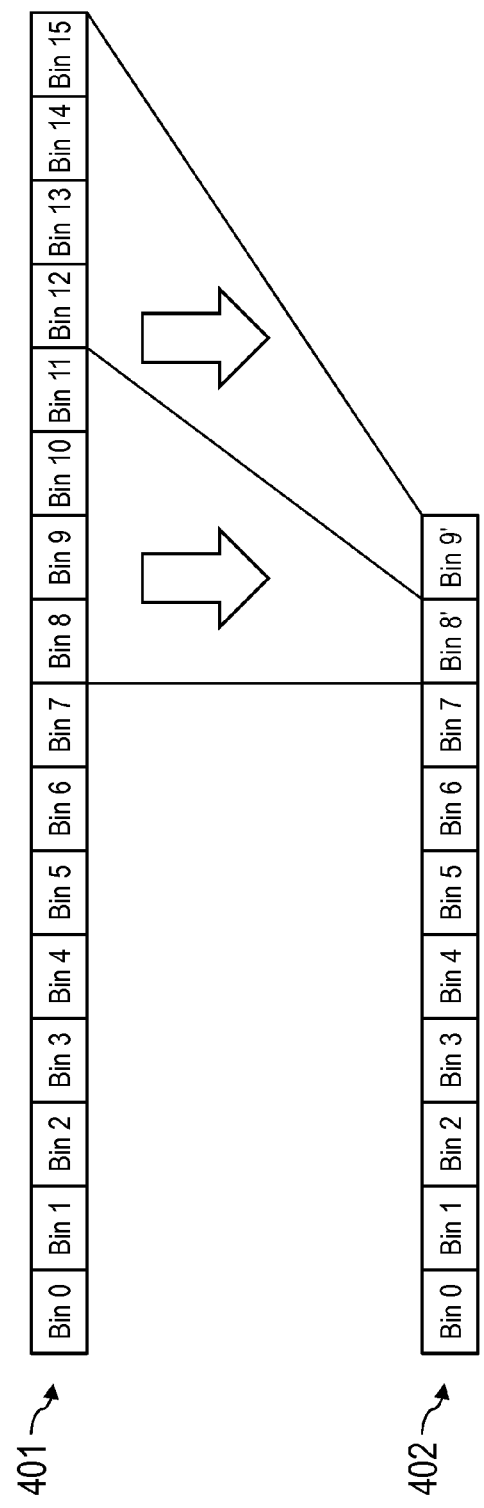
FIG. 4 shows a diagram depicting a first example of how FFT bins can be compressed.

FIG. 4 shows an exemplary embodiment of a first stage FFT spectrum 401 comprising 16 bins "Bin 0" to "Bin 15" and a FFT spectrum 402 that is a compressed version of the FFT spectrum 401. The FFT spectrum 402 may be stored in a random access memory instead of the FFT spectrum 401 thereby leading to reduced amount of memory required. In the example according to FIG. 4, the FFT spectrum 402 comprises FFT bins Bin 0 to Bin 7 without any compression applied;
a compressed bin Bin 8' based on an addition of the four bins of the FFT spectrum 401 according to:
Bin 8'=Bin 8+Bin 9+Bin 10+Bin 11.
a compressed bin Bin 9' based on an addition of the four bins of the FFT spectrum 401 according to:
Bin 9'=Bin 12+Bin 13+Bin 14+Bin 15.

Hence, storing the FFT spectrum 402 instead of the FFT spectrum 401 saves five bins, i.e. requires ca. 31% less memory.

It is noted that the summation for Bin 8' and Bin 9' can be applied on the fly (based on, e.g., the bins being supplied as data stream) without having to provide separate memory space for the respective bins that are subject to the addition. Hence, no intermediate saving of the bins Bin 9 to Bin 15 is required.

In another example, summing 4 bins together for a 256 bin FFT after Bin 128 results in 128+128/4=160 bins instead of said 256 bins.

Figure 5:
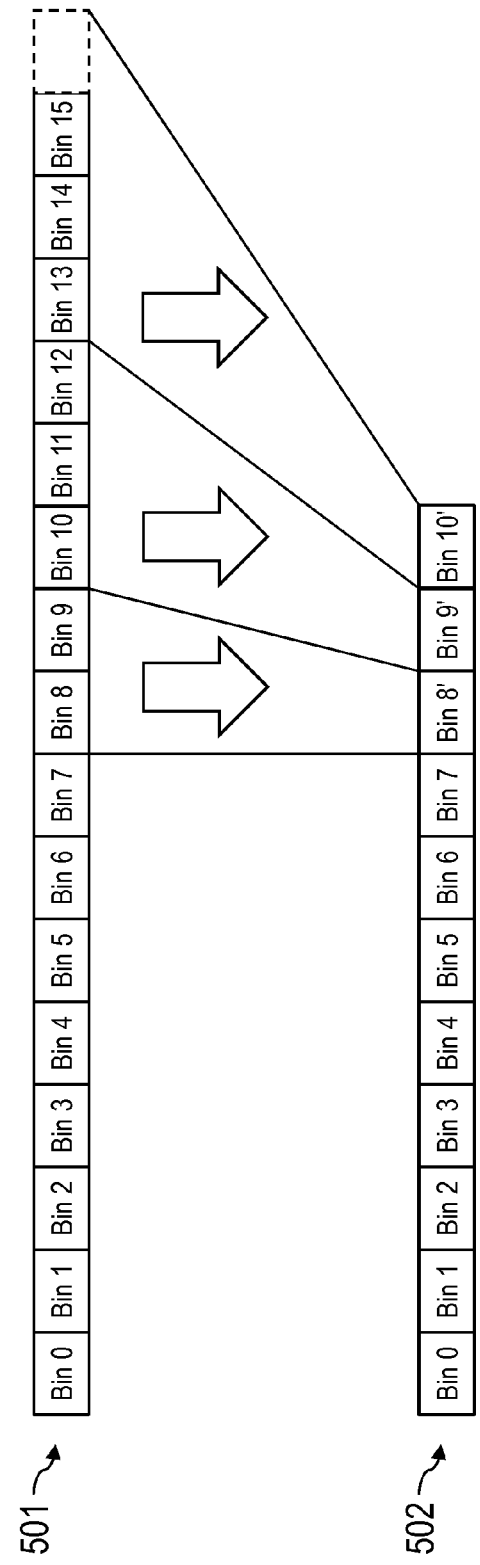
FIG. 5 shows another example of a progressive compression scheme for FFT bins.

It is also an option to combine a different number of bins for compression purposes. The number may increase with an increasing range in front of the vehicle. FIG. 5 shows an example based on FIG. 4, comprising a first stage FFT spectrum 501 comprising 16 bins "Bin 0" to "Bin 15" and a compressed FFT spectrum 502. To compile the FFT spectrum 502 an index increment of 1 is used, i.e. the first compression combines two bins, the second compression combines three bins, i.e.

the FFT bins Bin 0 to Bin 7 are not compressed;
a compressed bin Bin 8' is based on an addition of two bins of the FFT spectrum 501 according to:
Bin 8'=Bin 8+Bin 9;
a compressed bin Bin 9' is based on an addition of three bins of the FFT spectrum 501 according to:
Bin 9'=Bin 10+Bin 11+Bin 12; and
a compressed bin Bin 10' is based on an addition of four bins of the FFT spectrum 501 according to:
Bin 10'=Bin 13+Bin 14+Bin 15 (+Bin 16).

In this example, Bin 16 is not available.

Figure 6:
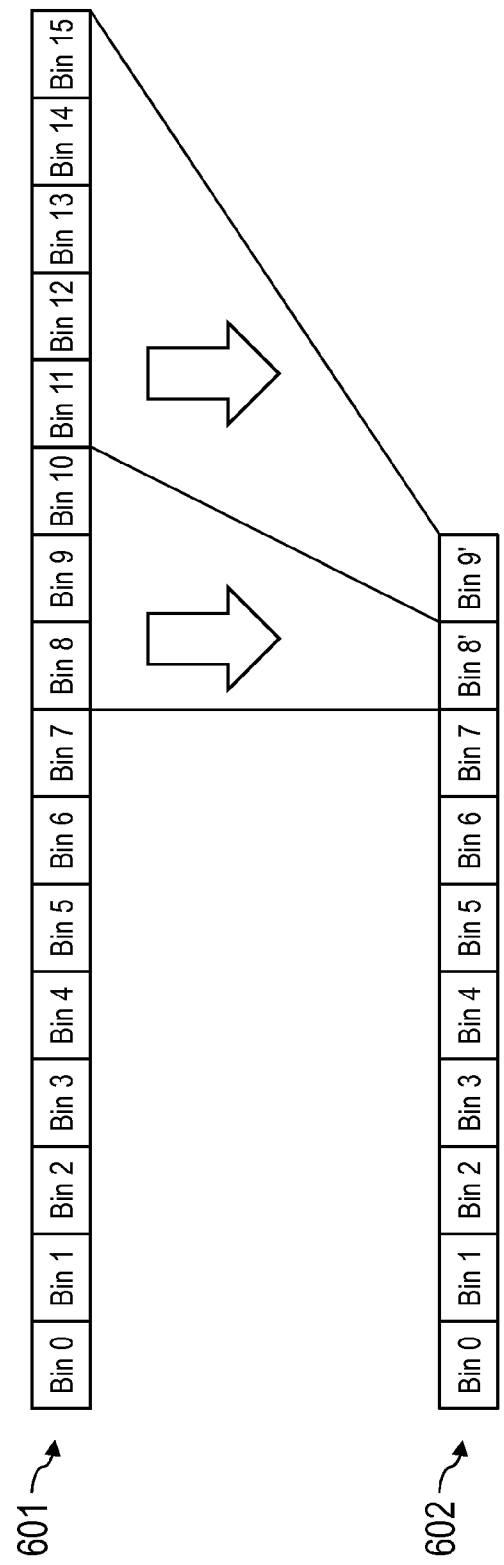
FIG. 6 shows yet one more example of a progressive compression scheme for FFT bins.

FIG. 6 shows an example based on FIG. 4, comprising a first stage FFT spectrum 601 comprising 16 bins "Bin 0" to "Bin 15" and a compressed FFT spectrum 602. To compile the FFT spectrum 602 an index increment of 2 is used, i.e. the first compression combines three bins, the second compression combines five bins, i.e.

the FFT bins Bin 0 to Bin 7 are not compressed;
a compressed bin Bin 8' is based on an addition of two bins of the FFT spectrum 601 according to:
Bin 8'=Bin 8+Bin 9+Bin 10;
a compressed bin Bin 9' is based on an addition of three bins of the FFT spectrum 601 according to:
Bin 9'=Bin 11+Bin 12+Bin 13+Bin 14+Bin 15.

In an exemplary scenario, a distance of 200 m ahead of a vehicle may be processed by a number of 1024 FFT bins, each FFT bin corresponding to 200 m/1024≈20 cm.

In such use case, the first 100 m may be processed with full precision (without compression of the FFT bins) and the next 100 m (from 100 m to 200 m range) may be processed with ¼ precision, i.e. a compression factor of four. In total, this would lead to a memory reduction for the full range from 0 m to 200 m of 50%.

In another example, the processing of the FFT bins may be as follows:
from 0 m to 70 m: full precision, no compression;
from 70 m to 100 m: ½ precision (compression factor 2);
from 100 m to 200 m: ¼ precision (compression factor 4), which would require only ca. 59% of the memory compared to the scenario without bin compression.

Hence, the compression of the FFT bins may start after a predefined bin index. In the examples shown in FIG. 4 to FIG. 6 the compression starts after Bin 7. The number of bins to be processed in each compression portion (i.e. Bin 8', Bin 9' or Bin 10' according to FIG. 4 to FIG. 6) may be constant (as shown in FIG. 4) or it may vary (as shown in FIG. 5 or in FIG. 6). It is noted that the linear increments shown in FIG. 5 and FIG. 6 are only examples of progressive compression schemes. It is also possible to apply different non-linear increments/decrements or varying patterns.

It is noted that the operation on the FFT bins may be a summation or accumulation of complex numbers in case the FFT bins are complex numbers. It is an option that a signal power of the FFT bins may be processed, e.g., accumulated.

The examples suggested herein may in particular be based on at least one of the following solutions. In particular combinations of the following features could be utilized in order to reach a desired result. The features of the method could be combined with any feature(s) of the device, apparatus or system or vice versa.

A method for processing radar signals is suggested, wherein said radar signals comprise digitized data received by at least one radar antenna, the method comprising:
determining FFT results based on the digitized data received;
storing a first group of the FFT results, wherein the first group of FFT results comprises at least two portions, wherein a first portion of FFT results is stored with a first accuracy and a second portion of FFT results is stored with a second accuracy.

The FFT results may also be referred to as FFT bins.

The first accuracy and the second accuracy may each be or be related to a compression level applied to the FFT results. The different portions of the first group that are stored in the memory have different levels of compression. This allows providing a progressive compression scheme depending on a predefined condition, e.g., a speed information, an environment information or a result of a CFAR information.

It is noted that there may be more than two portions of different compression. Advantageously, one portion of the first group comprises first stage FFT results that are not subject to any compression. These FFT results thus show the highest accuracy possible based on the sampled data.

According to one example, at least one portion of FFT results of the first group may comprise compressed data.

In an embodiment, the first accuracy corresponds to FFT results without compression.

In an embodiment, the second accuracy is lower than the first accuracy.

In an embodiment, the FFT results of the second portion are determined by combining FFT results based on the digitized data.

Combining the FFT results may be adding several first stage FFT results. Such combining may comprise a weighting mechanism, by multiplying each of the FFT results to be added with a predetermined value.

In an embodiment, the second accuracy is lower than the first accuracy and the first accuracy corresponds to a first range and the second accuracy corresponds to a second range, wherein the first range is closer than the second range.

The first range may be closer to a vehicle with a radar device than the second range.

In an embodiment, the first group of FFT results comprises more than two portions with different accuracies, wherein the different accuracies increase with an increasing distance.

Hence, the farther away from the radar device, the less accuracy (higher compression rate) may be used for the respective portion of FFT results. This results in one example of a progressive compression scheme, which needs less memory for storing more distant FFT results.

In an embodiment, the method further comprises:
determining the accuracy for each portion of FFT results based on a predefined condition.

In an embodiment, the predefined condition comprises a speed information.

In an embodiment, the predefined condition comprises an environment information.

In an embodiment, the predefined condition comprises a CFAR information.

In an embodiment, the method further comprises:
storing the first group of the FFT results without a second group of the FFT results.

The second group of FFT results may be filtered out (masked, rejected). These second group FFT results may in particular not be stored and may not be subject for further processing.

Storing the first group of FFT results without at least one portion may in particular be implemented such that only the FFT results that are different from such at least one portion are stored. Hence, the second group of FFT results may not be stored, which results in a reduced requirement for memory space.

Each of the FFT results (FFT bins) may be based on a first stage FFT and correspond to a particular section with regard to a distance covered by the received radar signal. Hence, an emitted (frequency modulated) radar signal (as used by, e.g., a FMCW radar) may be received and digitally sampled. Each sample in the frequency domain may correspond to a portion of the distance, e.g., ahead of a vehicle from which the radar signal is emitted.

As an option, more than one receiving radar antenna may be provided and digitized data may be obtained for each such antenna.

In an embodiment, the method further comprises:
processing the first group of FFT results.

Hence, only the first group of FFT results may be stored and further processed, e.g., by a second stage FFT and/or a third stage FFT.

In an embodiment, the FFT results are first stage FFT results.

In an embodiment, the method further comprises:
determining the first group of FFT results and/or the second group of FFT results based on a predefined condition.

It is noted that either the first group of FFT results (to be stored in the memory) or the second group of FFT results (not to be stored in the memory) may be determined. It may be sufficient to determine one of the groups. As an option, both groups may be determined In an embodiment, the predefined condition comprises a speed information.

For example, a speed of a vehicle operating the radar device may be considered by the predefined condition: Depending on the speed of the vehicle, the first group of FFT results (and/or the second group of FFT results) may be determined For example, if the vehicle travels at highway speed, a distance ahead of the vehicle from 70 m to 200 m may be considered, wherein the distance 0 m to 70 m may not be processed. Hence, the second group of FFT results corresponding to the near distance from 0 m to 70 m are not stored in the memory. If the vehicle slows down, the distance 0 m to 100 m may be considered, whereas the distance from 100 m to 200 m is not subject to further processing.

In an embodiment, the predefined condition comprises an environment information.

The environment information may indicated the surroundings of the vehicle, e.g., whether the vehicle is in a city or on a highway. The environment information may be determined by a camera and/or a navigation system.

In an embodiment, determining the FFT results and determining and the first group of FFT results and/or the second group of FFT results is provided by a single device, in particular a single chip.

The hardware determining the FFT results of the second group may be arranged in the vicinity of the hardware providing the FFT. Both may be arranged on the same device, die or chip.

In an embodiment, the predefined condition comprises an CFAR information.

Hence, the filter may be dynamically adjusted depending on the outcome of a CFAR operation: If an object is detected, this object or an area (distance) around this object is subject for further processing, whereas an area (distance) where no object was detected may be subject to bin rejection.

In an embodiment, the method further comprises:
determining the second group of FFT results based on a mask bit, wherein one mask bit is provided for each FFT result of the first group and of the second group.

This allows enabling various operation modes: For example, if the mask bit for a FFT result is set, this may indicate that the FFT result belongs to the first group; if the mask bit is not set, it may belong to the second group. Of course, this approach may be applied vice versa, i.e. if the mask bit for a FFT result is set, it may indicate that this FFT result belongs to second group and if the mask bit is not set, the FFT result may belong to the first group.

It is also possible to compare the FFT result with a predefined value in order to determine whether it belongs to the first group or the second group of FFT results.

Also, a device for processing radar signals is provided, said device comprising
a FFT engine for determining FFT results based on digitized data received from at least one antenna;
a compression engine for storing a first group of the FFT results, wherein the first group of FFT results comprises at least two portions, wherein a first portion of FFT results is stored with a first accuracy and a second portion of FFT results is stored with a second accuracy.

In an embodiment, the FFT engine and the compression engine are arranged on a single component, in particular on a single chip.

In an embodiment, the device further comprises
a bin rejection engine for storing the first group of the FFT results without a second group of the FFT results.

It is noted that the compression engine may be part of the bin rejection engine or vice versa. It is in particular an option that one physical entity or several physical entities are provided for the services of the compression engine and the bin rejection engine.

In an embodiment, the FFT engine and the bin rejection engine are arranged on a single component, in particular on a single chip.

Further, a device for processing radar signals is suggested, wherein said radar signals comprise digitized data received by at least one radar antenna, such device comprising:
- means for determining FFT results based on the digitized data received;
- means for storing a first group of the FFT results, wherein the first group of FFT results comprises at least two portions, wherein a first portion of FFT results is stored with a first accuracy and a second portion of FFT results is stored with a second accuracy.

In an embodiment, the device further comprises:
- means for storing the first group of the FFT results without at second group of the FFT results.

A computer program product is provided, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing radar signals, wherein said radar signals comprise digitized data received by at least one radar antenna, the method comprising:
   - determining Fast Fourier Transform (FFT) results based on the digitized data received; and
   - storing a first group of the FFT results in a memory, wherein the first group of FFT results comprises at least two portions,
   - wherein a first portion of the FFT results correspond to a first range of distances and is stored in accordance with a first compression rate yielding a first coded accuracy,
   - wherein a second portion of the FFT results correspond to a second range of distances and is stored in accordance with a second compression rate that is higher than the first compression rate, the second compression rate yielding a second coded accuracy, and
   - wherein the second portion of the FFT results are stored in the memory in accordance with the second compression rate based upon a summation of other FFT results within the second range of distances to utilize less memory compared to separately storing the other FFT results.

2. The method according to claim 1, wherein the first coded accuracy corresponds to the FFT results in accordance with the first compression rate yielding no compression.

3. The method according to claim 1, wherein the second coded accuracy is lower than the first coded accuracy.

4. The method according to claim 1, wherein the FFT results of the second portion are determined by combining the FFT results based on the digitized data.

5. The method according to claim 1, wherein
   the second coded accuracy is lower than the first coded accuracy, and
   wherein the first range of distances is closer than the second range of distances.

6. The method according to claim 1, wherein the first group of FFT results comprises more than two portions with different coded accuracies, and
   wherein the different coded accuracies increase with an increasing distance.

7. The method according to claim 1, further comprising:
   determining the coded accuracy for each portion of the FFT results based on a predefined condition.

8. The method according to claim 7, wherein the predefined condition comprises speed information.

9. The method according to claim 7, wherein the predefined condition comprises environment information.

10. The method according to claim 7, wherein the predefined condition comprises Constant False Alarm Rejection (CFAR) information.

11. The method according to claim 1, further comprising:
    storing the first group of the FFT results without a second group of the FFT results.

12. The method according to claim 11, further comprising:
    processing the first group of FFT results.

13. The method according to claim 11, wherein the FFT results are first stage FFT results.

14. The method according to claim 11, further comprising:
    determining the first group of FFT results and/or the second group of FFT results based on a predefined condition.

15. The method according to claim 14, wherein the predefined condition comprises speed information.

16. The method according to claim 14, wherein the predefined condition comprises environment information.

17. The method according to claim 14, wherein (i) determining the FFT results, (ii) determining the first group of FFT results, and/or (iii) determining the second group of FFT results is performed by a single chip.

18. The method according to claim 14, wherein the predefined condition comprises Constant False Alarm Rejection (CFAR) information.

19. The method according to claim 14, further comprising:
    determining the second group of FFT results based on a mask bit, wherein one mask bit is provided for each FFT result of the first group and of the second group.

20. A device for processing radar signals, comprising:
    one or more processors configured to determine Fast Fourier Transform (FFT) results based on digitized data received from at least one antenna; and
    a memory configured to store a first group of the FFT results,
    wherein the first group of FFT results comprises at least two portions,
    wherein a first portion of FFT results correspond to a first range of distances and is stored in accordance with a first compression rate yielding a first coded accuracy and a second portion of FFT results correspond to a second range of distances and is stored in accordance with a second compression rate yielding a second coded accuracy,
    wherein the second portion of the FFT results are stored in the memory in accordance with the second compression rate based upon a summation of other FFT results within the second range of distances to utilize less memory compared to separately storing the other FFT results.

21. The device according to claim 20, wherein the one or more processors are arranged on a single chip.

22. The device according to claim 20, wherein the one or more processors
    are further configured to store the first group of the FFT results in the memory without a second group of the FFT results.

23. A device for processing radar signals, wherein said radar signals comprise digitized data received by at least one radar antenna, comprising:
    means for determining Fast Fourier Transform (FFT) results based on the digitized data received; and
    means for storing a first group of the FFT results,
    wherein the first group of FFT results comprises at least two portions, and
    wherein a first portion of FFT results correspond to a first range of distances and is stored in accordance with a first compression rate yielding a first coded accuracy and a second portion of FFT results corresponding to a second range of distances and is stored in accordance with a second compression rate that is higher than the first compression rate, the second compression rate yielding a second coded accuracy,
    wherein the second portion of the FFT results are stored in accordance with the second compression rate based upon a summation of other FFT results within the second range of distances to utilize less memory compared to separately storing the other FFT results.

24. The device according to claim 23, further comprising:
    means for storing the first group of the FFT results without a second group of the FFT results.

25. The method according to claim 1, wherein the second portion of the FFT results includes each of the FFT results within the second range of distances.

26. The method according to claim 1, wherein the FFT results are first stage FFT results performed as part of a first stage FFT, and further comprising:
    performing a second stage FFT using the first stage FFT results to provide second stage FFT results indicative of velocity information; and
    performing a third stage FFT using the second stage FFT results to provide third stage FFT results indicative of azimuth angle information.

* * * * *